(12) United States Patent
Martin et al.

(10) Patent No.: US 12,485,647 B2
(45) Date of Patent: Dec. 2, 2025

(54) SHAPED PART

(71) Applicant: Novem Car Interior Design GmbH, Vorbach (DE)

(72) Inventors: Alexander Martin, Neuhaus an der Pegnitz (DE); Philipp Weih, Haag (DE)

(73) Assignee: Novem Car Interior Design GmbH, Vorbach (DE)

( * ) Notice: Subject to any disclaimer, the term of this patent is extended or adjusted under 35 U.S.C. 154(b) by 0 days.

(21) Appl. No.: 18/430,502

(22) Filed: Feb. 1, 2024

(65) Prior Publication Data

US 2024/0316899 A1 Sep. 26, 2024

(30) Foreign Application Priority Data

Feb. 9, 2023 (DE) .......................... 102023103205.4

(51) Int. Cl.
*B32B 7/12* (2006.01)
*B29D 11/00* (2006.01)
(Continued)

(52) U.S. Cl.
CPC .......... *B32B 7/12* (2013.01); *B29D 11/00798* (2013.01); *B32B 3/266* (2013.01); *B32B 5/022* (2013.01); *B32B 5/024* (2013.01); *B32B 9/002* (2013.01); *B32B 9/007* (2013.01); *B32B 21/08* (2013.01); *B32B 27/08* (2013.01); *B60K 35/21* (2024.01); *B60Q 3/14* (2017.02); *B60Q 3/54* (2017.02); *B60R 13/02* (2013.01); *C08J 7/044* (2020.01); *F21V 14/003* (2013.01); *F21V 23/06* (2013.01); *G02B 6/0011* (2013.01); *B32B 2307/202* (2013.01); *B32B 2307/4023* (2013.01); *B32B 2307/4026* (2013.01); *B32B 2307/41* (2013.01); *B32B 2307/412* (2013.01); *B32B 2307/414* (2013.01);
(Continued)

(58) Field of Classification Search
CPC ......... F21V 14/003; G09F 13/04; B60Q 3/51; B60Q 3/54
See application file for complete search history.

(56) References Cited

U.S. PATENT DOCUMENTS 9,914,390 B1 * 3/2018 Salter .................. B60Q 3/51
2014/0098547 A1 * 4/2014 Kostelnik ........... F21V 23/0442
362/382

(Continued)

FOREIGN PATENT DOCUMENTS

DE 102010003440 10/2011
DE 202020102686 5/2021
(Continued)

*Primary Examiner* — William N Harris
(74) *Attorney, Agent, or Firm* — Workman Nydegger

(57) ABSTRACT

The invention relates to a shaped part comprising a transparent or translucent decorative layer having a front face and a rear face opposite the front face, wherein an adhesive structure is arranged on the rear face of the decorative layer, wherein the adhesive structure comprises at least one first adhesive layer, the shaped part comprising a support and a light source for transilluminating at least the adhesive structure and the decorative layer. The invention is characterized in that the first adhesive layer is formed from an electrically conductive adhesive.

10 Claims, 2 Drawing Sheets

(51) Int. Cl.
  *B32B 3/26* (2006.01)
  *B32B 5/02* (2006.01)
  *B32B 9/00* (2006.01)
  *B32B 21/08* (2006.01)
  *B32B 27/08* (2006.01)
  *B60K 35/21* (2024.01)
  *B60Q 3/14* (2017.01)
  *B60Q 3/51* (2017.01)
  *B60Q 3/54* (2017.01)
  *B60R 13/02* (2006.01)
  *C08J 7/044* (2020.01)
  *F21V 8/00* (2006.01)
  *F21V 14/00* (2018.01)
  *F21V 23/06* (2006.01)
  *F21W 106/00* (2018.01)
  *F21W 121/00* (2006.01)

(52) U.S. Cl.
  CPC ..... *B32B 2451/00* (2013.01); *B32B 2605/003* (2013.01); *B60K 2360/332* (2024.01); *B60K 2360/34* (2024.01); *B60Q 3/51* (2017.02); *B60R 2013/0287* (2013.01); *F21W 2106/00* (2018.01); *F21W 2121/00* (2013.01)

(56) References Cited

U.S. PATENT DOCUMENTS

| | | | |
|---|---|---|---|
| 2015/0274067 A1* | 10/2015 | Salter | B60Q 3/78 362/510 |
| 2018/0001816 A1* | 1/2018 | Dellock | H05B 33/22 |
| 2018/0086260 A1* | 3/2018 | Barillot | B60Q 1/268 |
| 2018/0118101 A1* | 5/2018 | Salter | B60Q 3/20 |
| 2018/0147918 A1* | 5/2018 | Salter | B60J 5/101 |

FOREIGN PATENT DOCUMENTS

| | | |
|---|---|---|
| EP | 2215298 | 3/2014 |
| KR | 10 20210056613 | 5/2021 |

\* cited by examiner

SHAPED PART

CROSS-REFERENCE TO RELATED APPLICATIONS

The present invention claims priority to. DE 102023103205.4, filed on Feb. 9, 2023. The entire content of each of the aforementioned patent applications is incorporated herein by reference.

BACKGROUND OF THE INVENTION

1. Field of the Invention

The invention relates to a shaped part, in particular a decorative part (also: body trim part) and/or panel part designed as a shaped part for the vehicle interior.

2. The Relevant Technology

Numerous decorative and panel parts are installed in the vehicle interior, for example door panels, console panels, and instrument panels. The decorative and panel parts also include control buttons and their covers.

DE 20 2020 102 686 U1 discloses shaped parts with a translucent decorative layer with a lamination on the rear face, wherein the lamination comprises a light-sealing layer and a light-transmissive layer and wherein recesses are provided in at least one portion of the light-blocking layer, which recesses form a symbol that can be displayed on the front face of the decorative layer. The shaped part comprises a support on the rear face of the lamination and a light source for transilluminating the lamination and the decorative layer.

The demands on such shaped parts are constantly increasing; in particular, there is a need for shaped parts with which diverse effects, in particular optical effects, can be realized on a visible face of the shaped parts.

BRIEF SUMMARY OF THE INVENTION

The invention is therefore based on the object of specifying a new shaped part, in particular a shaped part which enables a wide variety of functions and/or effects, in particular optical effects such as a changing design.

This object is achieved by a shaped part having the features of the independent claims. Advantageous embodiments and further developments are provided in the dependent claims.

The shaped part according to the invention comprises a transparent or translucent decorative layer with a front face and a rear face opposite the front face, wherein an adhesive structure is arranged on the rear face of the decorative layer, wherein the adhesive structure has at least one first adhesive layer. The shaped part further comprises a support, in particular a light-transmissive support, and a light source for transilluminating at least the adhesive structure and the decorative layer. The invention provides that the first adhesive layer is formed from an electrically conductive adhesive.

Electrically conductive adhesives (also: glues) are, for example, adhesives which are provided with conductive fillers and/or particles, in particular metallic fillers and/or particles. Examples of these fillers and/or particles are silver and graphite.

The front face of the decorative layer usually forms the visible face of the shaped part. The support can be arranged on the rear face of the adhesive structure, in particular injection-molded onto the rear face of the adhesive structure by means of back injection molding and/or glued to the rear face of the decorative layer by means of the adhesive structure. However, it is also possible, for example, for a nonwoven to be arranged on the rear face of the decorative layer by means of the adhesive structure. In this case, the support can be arranged on the rear face of the nonwoven, in particular injection-molded onto the rear face of the nonwoven by means of back injection molding or glued to the rear face of the nonwoven by means of an adhesive. The support is preferably formed from a transparent or translucent material, in particular a plastics material, or comprises a transparent or translucent material, in particular a plastics material. The support and/or nonwoven are preferably light-transmissive, i.e. transparent or translucent, or have light-transmissive recesses or openings, so that light emanating from the light source can transilluminate the adhesive structure and the decorative layer. For this purpose, the adhesive structure can likewise be designed to be light-transmissive, for example by light-transmissive materials and/or recesses for light conduction.

The advantages of the shaped part according to the invention are in particular that the adhesive structure, in addition to the bonding of further layers and/or of the support to the decorative layer, enables further functions and/or effects in the shaped part or of the shaped part, due to the electrical conductivity of the first adhesive layer. These functions and/or effects can be an electrical contacting of the light source and/or further electrical or electronic components by means of the first adhesive layer, which can be realized for example by a corresponding shaping of the first adhesive layer. The functions and/or effects can also be a heating application which can be realized by a corresponding shaping of the first adhesive layer and flow of current through the first adhesive layer. Further functions and/or effects can result from the combination with electrically activatable materials.

One embodiment of the invention provides that the first adhesive layer can be connected to a power source via at least one electrical connection, in particular at least two electrical connections. The shaped part thus has at least one electrical connection, in particular at least two electrical connections, for electrically contacting the first adhesive layer. The power source, which can be connected to the electrical connections, can be arranged on or in the shaped part or alternatively at a distance from the shaped part. A power source of a vehicle in which the shaped part is installed can also be considered as a power source.

According to a development of the invention, the first adhesive layer is a light-sealing adhesive layer, wherein one or more recesses are provided for light conduction in the first adhesive layer, wherein the recess or recesses form a symbol. The recess or recesses can be introduced into the first adhesive layer by means of lasers and/or punching, or the first adhesive layer has the recess or recesses already when it is applied, for example by means of printing or lamination. When the light source is switched on, the symbol on the front face of the decorative layer is visible to an observer, in that light emanating from the light source is conducted at least through the adhesive structure and the decorative layer. The symbol can thus be displayed by switching on the light source on the front face of the decorative layer, designed as the visible side of the shaped part.

"Forming a symbol" means in particular that the recesses form a symbol when viewed from above. The symbol is preferably one or more functional symbols and/or geometries and/or shapes and/or decorations and/or lines following the shape, which are shown on the front face of the decorative layer, which is designed as the visible side of the shaped part. Furthermore, the symbol can also be one or more letters, logotypes, characters or other design elements.

A development provides that the symbol on the front face of the decorative layer is not visible to an observer when the light source is switched off. In particular, it can be provided that when the light source is switched off, the front face of the decorative layer appears as a homogeneous surface to an observer.

This has the advantage that the shaped part has a no-show effect, i.e. the symbol is not recognizable to the observer when the light source is switched off (so-called tag design). In this state, the decorative layer appears to an observer as a homogeneous surface. However, when the light source is switched on, the symbol on the front face of the decorative layer is clearly visible to the observer (so-called night design).

It can be provided that the adhesive structure comprises a second, light-transmissive adhesive layer, wherein the second adhesive layer is arranged on the front face or on the rear face of the first adhesive layer.

Furthermore, it can be provided that the adhesive structure comprises a third, light-transmissive adhesive layer, wherein the third adhesive layer is arranged on the side of the first adhesive layer opposite the second adhesive layer, so that the first adhesive layer is sandwiched between the second adhesive layer and the third adhesive layer.

In particular, the second adhesive layer and/or the third adhesive layer can have as its main function the adhesive bonding between the different layers and/or components of the shaped part, while the first adhesive layer has as its main function the realization of additional functions based on the electrically conductive adhesive.

One embodiment of the invention provides that the first adhesive layer forms a heating layer which, when current flows through the first adhesive layer, converts electrical energy into thermal energy. For example, for this purpose, the recesses in the first adhesive layer can be shaped such that the first adhesive layer forms at least one conductor track, in particular at least one conductor track which extends with a plurality of curvatures and/or deflections in the shaped part. For example, the conductor track and thus in particular also the first adhesive layer can be arranged in a meandering shape on the rear face of the decorative layer or on the rear face or front face of the second adhesive layer. In this case, electrical connections contact the two ends of this conductor track. The at least one conductor track formed by the first adhesive layer is thus a heating wire. When current flows through this conductor track, it heats up.

According to a further development of the invention, an electrically activatable material is integrated into the first adhesive layer, for example mixed in. The electrically activatable material can be metal particles or nanoparticles, for example. The electrically activatable material can also be liquid crystals or a liquid crystal film.

According to a variant embodiment of the invention, the first adhesive layer forms a switchable layer which, when the first adhesive layer is connected to a current source, activates the activatable material in such a way that the first adhesive layer changes from a transparent state to a translucent or opaque state or from a translucent or opaque state to a transparent state. For example, a liquid crystal film can be integrated into the first adhesive layer as an activatable material in such a way that the conductive adhesive of the first adhesive layer contacts the film on both sides, so that the film is electrically conductively coated on both sides. When connected to the power source, this film changes from a transparent state to a translucent or opaque state or from a translucent or opaque state to a transparent state.

It can be provided that the activatable material is arranged in regions in the first adhesive layer, wherein the region or regions form a symbol or the negative of a symbol which can be displayed on the front face of the decorative layer.

A further variant embodiment of the invention provides that the first adhesive layer is formed by a colored or dyed adhesive or is printed in color. The color of the adhesive can correspond to the light color of the light source in such a way that the adhesive is light-transmissive for this light color.

Preferably, the decorative layer comprises or is a wood veneer and/or a plastics material and/or a film and/or a woven fabric and/or a textile layer and/or a cloth and/or a carbon and/or a stone layer and/or a slate layer and/or a marble layer. The decorative layer is in particular a continuous decorative layer, i.e. the decorative layer does not have any recesses and/or perforations and/or light passages.

It can be provided that the light source, preferably in the region of the recess or recesses in the first adhesive layer, is arranged on the support, in particular on the rear face of the support, or in the support, in particular in a recess in the support. It can also be provided that the light source is arranged laterally on the support and/or the light is introduced laterally on the support, for example via light domes. Furthermore, it can be provided that the light source is a surface light conductor and/or an LED strip and/or comprises one or more LEDs and/or LED strips.

It can be provided that a protective and/or optical layer is arranged on the front face of the decorative layer, wherein the protective and/or optical layer preferably comprises lacquer or polyurethane (PUR) or plastics material or is formed from a lacquer or polyurethane (PUR) or plastics material. For arranging a protective and/or optical layer made of PUR or plastics material on the front face of the decorative layer, PUR or plastics material is preferably poured onto the front face.

BRIEF DESCRIPTION OF THE DRAWINGS

The invention is explained in more detail below also with regard to further features and advantages on the basis of the description of exemplary embodiments and with reference to the accompanying schematic drawing in which.

Corresponding parts and components are also identified with the same reference numbers in each of the various exemplary embodiments.

DETAILED DESCRIPTION

Figure 1:
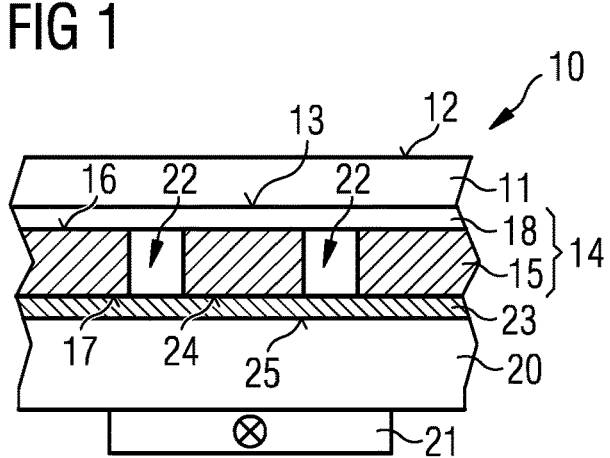
FIG. 1 shows a schematic sectional representation of a detail of a first exemplary embodiment of a shaped part according to the invention.

FIG. 1 to FIG. 5 each show an exemplary embodiment of a decorative and/or panel part according to the invention designed as a shaped part 10 for the vehicle interior. The shaped part 10 comprises a transparent or translucent decorative layer 11, for example a wood veneer, with a front face 12 and a rear face 13 opposite the front face 12, wherein an adhesive structure 14 is arranged on the rear face 13 of the decorative layer 11.

The adhesive structure 14 always has at least one first adhesive layer 15. The first adhesive layer 15 is formed from an electrically conductive adhesive. According to the exemplary embodiments according to FIG. 1 to FIG. 5, a second adhesive layer 18 is likewise provided in the adhesive structure 14. The second adhesive layer 18 is light-transmissive. According to the exemplary embodiments according to FIG. 1 and FIG. 3 to FIG. 5, the second adhesive layer 18 is arranged on a front face 16 of the first adhesive layer 15. According to the exemplary embodiment according to FIG. 2, the second adhesive layer 18 is arranged on a rear face 17 of the first adhesive layer 15. According to the exemplary embodiment according to FIG. 3, a third adhesive layer 19 is also provided. The third adhesive layer 19 is likewise light-transmissive and is arranged on the side of the first adhesive layer 15 opposite the second adhesive layer 18, so that the first adhesive layer 15 is sandwiched between the second adhesive layer 18 and the third adhesive layer 19.

Figure 2:
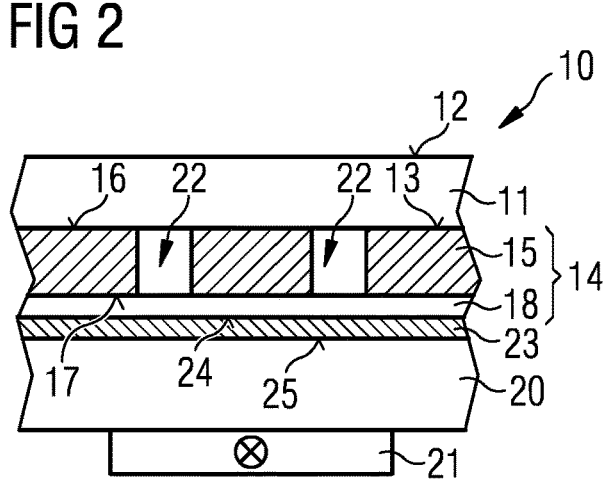
FIG. 2 shows a schematic sectional representation of a detail of a second exemplary embodiment of a shaped part according to the invention.
Figure 3:
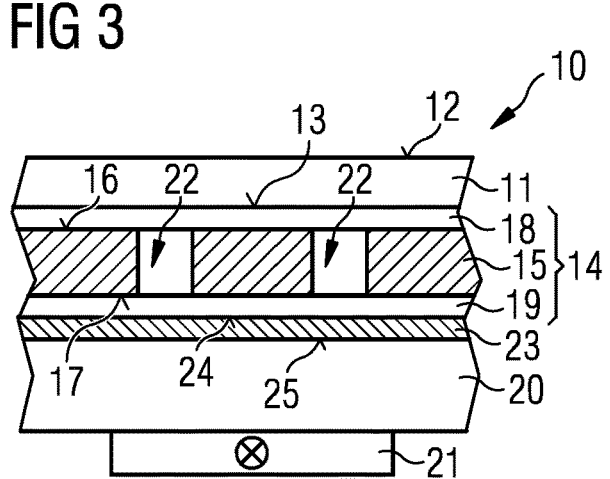
FIG. 3 shows a schematic sectional representation of a detail of a third exemplary embodiment of a shaped part according to the invention.
Figure 5:
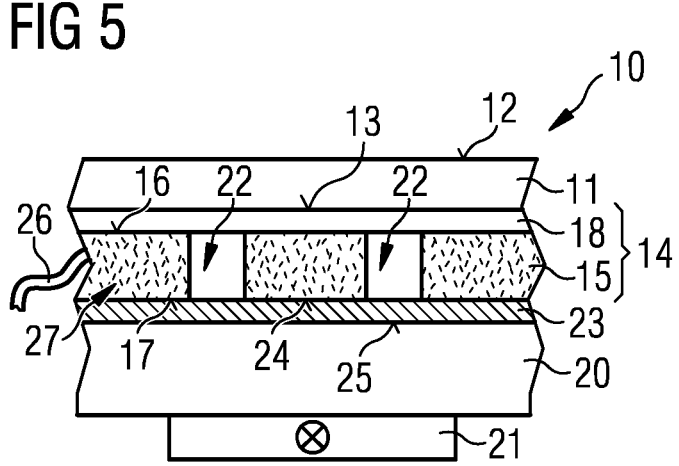
FIG. 5 shows a schematic sectional representation of a detail of a fifth exemplary embodiment of a shaped part according to the invention.

According to the exemplary embodiments according to FIG. 1 to FIG. 3 and the exemplary embodiment according to FIG. 5, the first adhesive layer 15 is a light-sealing adhesive layer, wherein a plurality of recesses 22 are provided for light conduction in the first adhesive layer 15, wherein the recesses 22 form a symbol which can be displayed on the front face 12 of the decorative layer 11.

A light-transmissive nonwoven 23 is arranged on the rear face 13 of the decorative layer 11 in all exemplary embodiments, wherein the nonwoven 23 is adhesively bonded to the rear face 13 of the decorative layer 11 by means of the adhesive structure 14.

The shaped part 10 further comprises a light-transmissive support 20, wherein the support 20 is arranged on the rear face 25 of the nonwoven 23, in particular injection-molded onto the rear face 25 of the nonwoven 23 by means of back injection molding or is glued to the rear face 25 of the nonwoven 23 by means of an adhesive.

Furthermore, the shaped part 10 comprises a light source 21 arranged on a rear face of the support 20 for transilluminating the support 20, the nonwoven 23, the adhesive structure 14, and the decorative layer 11. For example, the light source 21 is a surface light conductor or an LED strip. In the exemplary embodiments according to FIG. 1 to FIG. 3 and FIG. 5, the symbol formed by the recesses 22 on the front face 12 of the decorative layer 11 is visible to an observer when the light source 21 is switched on, in that light emanating from the light source 21 is guided at least through the adhesive structure 14 and the decorative layer 11. When the light source 21 is switched off, the front face 12 of the decorative layer 11 appears to an observer as a homogeneous surface; the symbol is not visible to an observer.

According to the exemplary embodiment according to FIG. 5, the first adhesive layer 15 can form a heating layer, wherein the first adhesive layer 15 is connected to a power source by means of a schematically shown electrical connection 26 and emits heat energy when electrical energy is supplied to the first adhesive layer 15. For example, the first adhesive layer 15 can be arranged in a meandering manner on the rear face 13 of the decorative layer 11 or on the rear face or front face of the second adhesive layer 18. The power source can be arranged on or in the shaped part 10 or alternatively at a distance from the shaped part 10.

Figure 4:
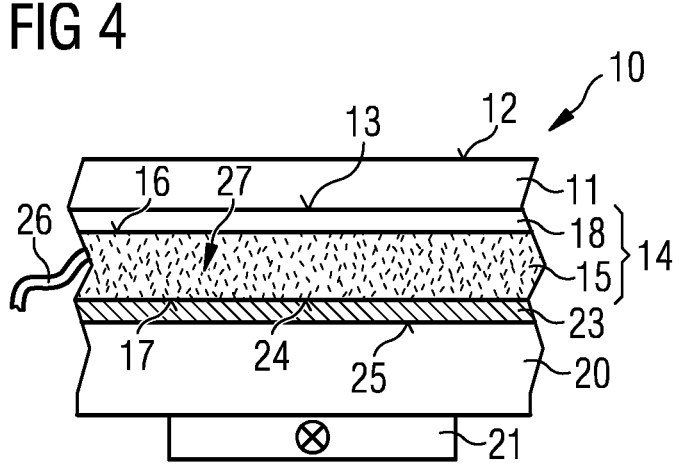
FIG. 4 shows a schematic sectional representation of a detail of a fourth exemplary embodiment of a shaped part according to the invention.

According to the exemplary embodiments according to FIG. 4 and FIG. 5, an electrically activatable material 27 is provided in the first adhesive layer 15. The activatable material 27 can be, for example, metal particles or nanoparticles.

According to the exemplary embodiment according to FIG. 4, the first adhesive layer 15 is designed as a switchable layer which, when connected to a power source, for example via the schematically shown current connection 26, activates the activatable material 27 in such a way that the first adhesive layer 15 changes from a transparent state into a translucent or opaque state or from a translucent or opaque state into a transparent state.

According to a further variant embodiment not shown in the figures, it can be provided that the activatable material 27 is arranged in regions in the first adhesive layer 15, wherein the region or regions form a symbol or the negative of a symbol which can be displayed on the front face 12 of the decorative layer 11.

Furthermore, it can be provided that the first adhesive layer 15 is formed by a colored or dyed adhesive or is printed in color. The color of the adhesive can correspond to the light color of the light source 21 in such a way that the adhesive is light-transmissive for this light color.

LIST OF REFERENCE SIGNS

10 Shaped part
11 Decorative layer
12 Front face
13 Rear face
14 Adhesive structure
15 First adhesive layer
16 Front face (first adhesive layer)
17 Rear face (first adhesive layer)
18 Second adhesive layer
19 Third adhesive layer
20 Support
21 Light source
22 Recess
23 Nonwoven
24 Rear face (adhesive structure)
25 Rear face (nonwoven)
26 Electrical connection
27 Activatable material

We claim:
1. A shaped part comprising:
a transparent or translucent decorative layer having a front face and a rear face opposite the front face, wherein:
an adhesive structure is arranged on the rear face of the decorative layer, wherein the adhesive structure has at least one first adhesive layer,
the shaped part comprises a support and a light source for transilluminating at least the adhesive structure and the decorative layer, and
the first adhesive layer is formed from an electrically conductive adhesive;
an electrically activatable material is integrated into the first adhesive layer, the electrically activatable material being arranged in regions in the first adhesive layer; and
the regions of the first adhesive layer form a symbol or the negative of a symbol which can be displayed on the front face of the decorative layer.

2. The shaped part according to claim 1, wherein:
the first adhesive layer can be connected to a power source via at least one electrical connection.

3. The shaped part according to claim 1, wherein:
the first adhesive layer is a light-sealing adhesive layer;
one or more recesses are provided in the first adhesive layer for light transmission, wherein the recess or recesses form a symbol; and
when the light source is switched on, the symbol on the front face of the decorative layer is visible to an observer, in that light emanating from the light source is directed at least through the adhesive structure and the decorative layer.

4. The shaped part according to claim 3, wherein:
when the light source is switched off, the symbol on the front face of the decorative layer is not visible to an observer.

5. The shaped part according to claim 3, wherein:
the adhesive structure comprises a second, light-transmissive adhesive layer; and
the second adhesive layer is arranged on the front face or on the rear face of the first adhesive layer.

6. The shaped part according to claim 5, wherein:
the adhesive structure comprises a third, light-transmissive adhesive layer; and
the third adhesive layer is arranged on the side of the first adhesive layer opposite the second adhesive layer, so that the first adhesive layer is sandwiched between the second adhesive layer and the third adhesive layer.

7. The shaped part according to claim 1, wherein:
the first adhesive layer forms a heating layer which, when current flows through the first adhesive layer, converts electrical energy into heat energy.

8. The shaped part according to claim 1, wherein:
the first adhesive layer forms a switchable layer which, when the first adhesive layer is connected to a power source, activates the activatable material in such a way that the first adhesive layer changes from a transparent state to a translucent or opaque state or from a translucent or opaque state to a transparent state.

9. The shaped part according to claim 1, wherein:
the first adhesive layer is formed by a colored or dyed adhesive or is printed in color.

10. The shaped part according to claim 1, wherein the decorative layer comprises any one or more of the materials selected from the group consisting of:
a wood veneer;
a plastics material;
a film;
a woven fabric;
a textile layer;
a cloth;
a carbon;
a stone layer;
a slate layer;
a marble layer.

\* \* \* \* \*